United States Patent
Su et al.

(10) Patent No.: US 9,569,387 B2
(45) Date of Patent: Feb. 14, 2017

(54) MASTER-SLAVE DETECTION METHOD AND MASTER-SLAVE DETECTION CIRCUIT

(71) Applicant: Realtek Semiconductor Corp., HsinChu (TW)

(72) Inventors: Ching-Yao Su, Taichung (TW); Liang-Wei Huang, Hsinchu (TW); Hsuan-Ting Ho, Taichung (TW); Sheng-Fu Chuang, Taichung (TW)

(73) Assignee: Realtek Semiconductor Corp., HsinChu (TW)

( * ) Notice: Subject to any disclaimer, the term of this patent is extended or adjusted under 35 U.S.C. 154(b) by 460 days.

(21) Appl. No.: 14/201,943

(22) Filed: Mar. 10, 2014

(65) Prior Publication Data

US 2014/0258575 A1 Sep. 11, 2014

(30) Foreign Application Priority Data

Mar. 11, 2013 (TW) .............................. 102108533 A

(51) Int. Cl.
*G06F 13/00* (2006.01)
*G06F 13/362* (2006.01)
*G06F 15/16* (2006.01)

(52) U.S. Cl.
CPC .................................. *G06F 13/362* (2013.01)

(58) Field of Classification Search
CPC .................................. G06F 13/00; G06F 15/16
USPC .............................. 710/110, 10, 36; 709/208
See application file for complete search history.

(56) References Cited

U.S. PATENT DOCUMENTS

| | | | | |
|---|---|---|---|---|
| 4,970,506 A | * | 11/1990 | Sakaida | H04L 5/1492 340/3.2 |
| 6,718,395 B1 | * | 4/2004 | Ziegler | H04B 1/7156 370/350 |
| 2002/0019895 A1 | * | 2/2002 | Kim | G06F 13/423 710/100 |
| 2002/0133631 A1 | | 9/2002 | Yun | |
| 2006/0069452 A1 | * | 3/2006 | Pfister | H04L 41/0803 700/18 |
| 2009/0013114 A1 | * | 1/2009 | Sanders | G06F 13/4278 710/110 |
| 2009/0022174 A1 | * | 1/2009 | Wang | H04W 74/08 370/462 |
| 2010/0250804 A1 | * | 9/2010 | Lim | G06F 13/4221 710/110 |

(Continued)

FOREIGN PATENT DOCUMENTS

TW I376117 11/2012

*Primary Examiner* — Christopher Shin
(74) *Attorney, Agent, or Firm* — Winston Hsu; Scott Margo

(57) ABSTRACT

A master-slave detection method includes: every single time period, utilizing a random manner for determining whether a first device is used to transmit a specific pulse signal to a second device; every single time period, utilizing a random manner for determining whether the second device is used to transmit the specific pulse signal to the first device; when the first device receives at least one portion of the specific pulse signal earlier than the second device, setting the first device as a master device, stopping the master device from sending the specific pulse signal and utilizing the master device to start transmitting a specific sequence; and setting the second device as a slave device when the second device receives the specific sequence. The at least one portion of the specific pulse signal includes continuous single pulses.

14 Claims, 7 Drawing Sheets

(56) References Cited

U.S. PATENT DOCUMENTS

| | | | |
|---|---|---|---|
| 2011/0119419 A1* | 5/2011 | Chapelle | G06F 13/4068 710/110 |
| 2011/0289176 A1* | 11/2011 | Toyama | H04L 12/24 709/211 |
| 2012/0011217 A1 | 1/2012 | Weng | |
| 2012/0072629 A1* | 3/2012 | Tokuda | G06F 13/364 710/110 |
| 2014/0093002 A1* | 4/2014 | Lekatsas | H04B 3/548 375/259 |
| 2014/0143461 A1* | 5/2014 | Chettimada | G06F 13/4291 710/110 |
| 2014/0258575 A1* | 9/2014 | Su | G06F 13/362 710/110 |

* cited by examiner

MASTER-SLAVE DETECTION METHOD AND MASTER-SLAVE DETECTION CIRCUIT

BACKGROUND OF THE INVENTION

1. Field of the Invention

The disclosed embodiments of the present invention relate to a master-slave detection method and related circuits, and more particularly, to a master-slave detection method applied in an Ethernet wired transmission system and a related circuit thereof.

2. Description of the Prior Art

In conventional wired transmission systems, expensive wires are often employed for increasing transmission distance and speed and reducing the design complexity of receivers, such as the Fiber Optical network. There are standards such as Ethernet, however, which uses cheaper wires while still requesting a certain degree of transmission distance and speed.

In the conventional fast Ethernet (such as 100BASE-T, 1000BASE-T), two un-shield twisted pairs (UTP) are utilized for performing wired transmission. For devices at both sides, one un-shield twisted pair is dedicated for data transmission and the other is dedicated for data receiving at the same time when a link is up. There are other applications with even more stringent requests for cost and weight that hope to significantly reduce the complexity of network specification and cost of wires while retaining a wide bandwidth with a single un-shield twisted pair, such as One Pair Ethernet (OPEN) alliance. Two devices connected to each other by a single un-shield twisted pair are not applicable for the auto-negotiation mechanism, however, because of the collision problem which will occur as soon as the cable is connected. The auto-negotiation mechanism of the conventional fast Ethernet cannot be applied to allocate two devices in the single un-shield twisted pair system as a master device and a slave device.

Therefore, there is a need for a novel master-slave detection method to allocate two devices in a single un-shield twisted pair system as a master device and a slave device.

SUMMARY OF THE INVENTION

One of the objectives of the present invention is to provide a master-slave detection method and a related circuit thereof to allocate two devices as a master device and a slave device.

According to a first embodiment of the present invention, a master-slave detection method is disclosed. The master-slave detection method comprises: determining whether to control a first device to transmit a specific pulse signal to a second device; determining whether to control the second device to transmit the specific pulse signal to the first device; when the first device receives at least one portion of the specific pulse signal earlier than the second device, configuring the first device as a master device, and controlling the master device to stop sending the specific pulse signal and start transmitting a specific sequence; and when the second device receives the specific sequence, configuring the second device as a slave device.

According to a second embodiment of the present invention, a master-slave detection method is disclosed. The master-slave detection method comprises: utilizing a first device to periodically transmit a first pseudo-random code to a second device, wherein the first pseudo-random code is a first master pseudo-random code or a first slave pseudo-random code; when the first device transmits the first pseudo-random code, the first device will perform a specific comparison operation upon the received signals by employing the first slave pseudo-random code and a second slave pseudo-random code respectively; and when the first device transmits the first slave pseudo-random code, the first device will perform the specific comparison operation upon the received signals by employing the first master pseudo-random code and a second master pseudo-random code respectively; utilizing the second device to periodically transmit a second pseudo-random code to the first device, wherein the second pseudo-random code is the first master pseudo-random code or the first slave pseudo-random code; when the second device transmits the first pseudo-random code, the second device will perform the specific comparison operation upon the received signals by employing the first slave pseudo-random code and the second slave pseudo-random code respectively; and when the second device transmits the first slave pseudo-random code, the second device will perform the specific comparison operation upon the received signals by employing the first master pseudo-random code and the second master pseudo-random code respectively; when the first device obtains a matching result of the specific comparison operation earlier than the second device, configuring the first device as a master device or a slave device accordingly by referring to the first pseudo-random code utilized by the first device for the specific comparison operation, and controlling the first device to transmit a third pseudo-random code to the second device; and when the second device receives the third pseudo-random code, configuring the second device as the master device or the slave device accordingly by referring to the third pseudo-random code.

According to a third embodiment of the present invention, a master-slave detection circuit is disclosed. The master-slave detection circuit comprises a transmission control circuit, a reception control circuit, and a control circuit. The transmission control circuit is arranged for periodically determining whether to transmit a specific pulse signal from a first device to a second device. The reception control circuit is arranged for determining whether the first device receives at least one portion of the specific pulse signal. The control circuit is arranged for configuring the device as a master device when the first device receives at least one portion of the specific pulse signal, and controlling the master device to stop transmitting the specific pulse signal and start transmitting a specific sequence; or configuring the first device as a slave device when the first device receives the specific sequence.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is coupled to another device, that connection may be through a direct electrical connection, or through an indirect electrical connection via other devices and connections.

Figure 1:
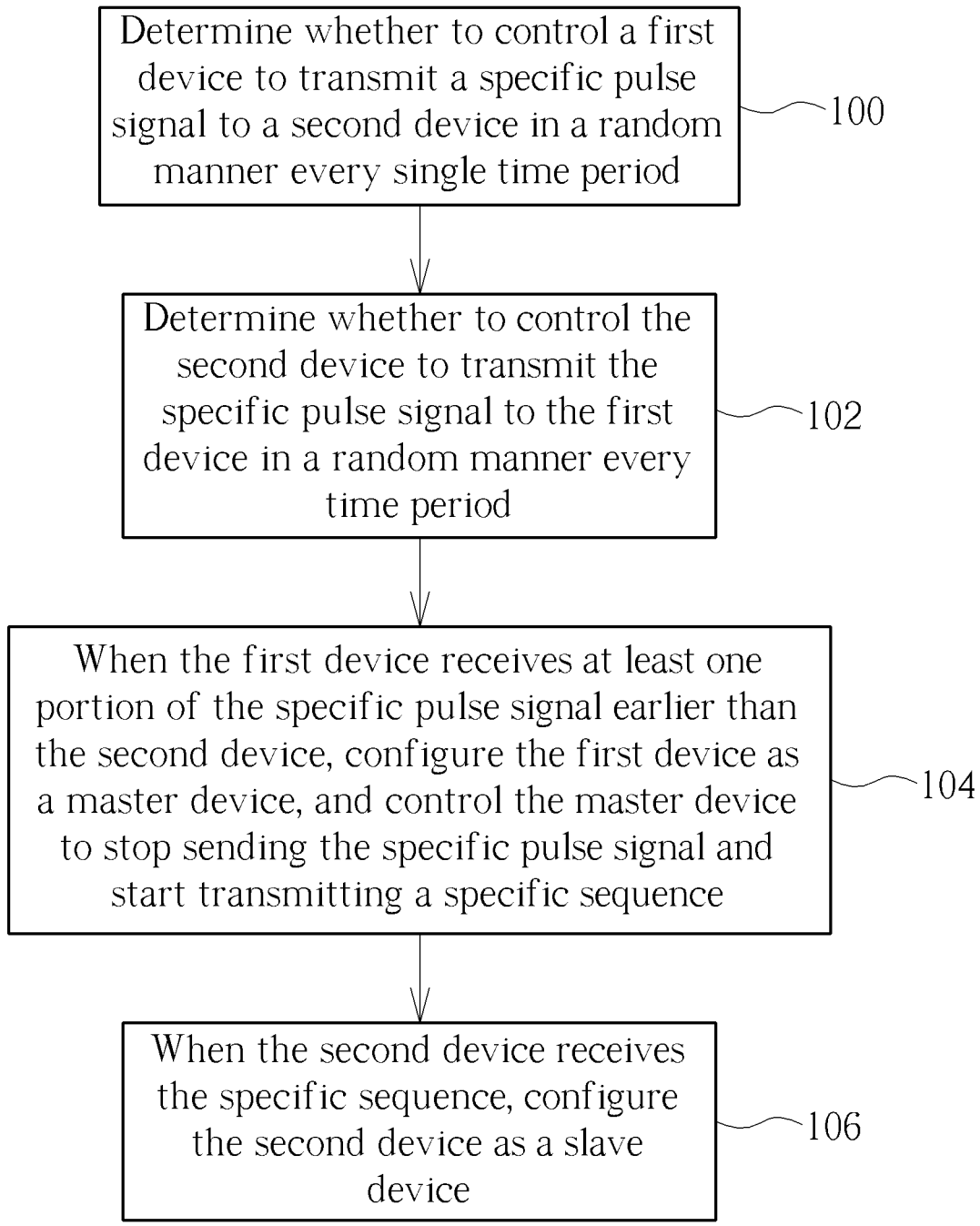
FIG. 1 is a flowchart illustrating a master-slave detection method according to an exemplary embodiment of the present invention.

Please refer to FIG. 1, which is a flowchart illustrating a master-slave detection method according to an exemplary embodiment of the present invention. Provided that substantially the same result is achieved, the steps of the flowchart shown in FIG. 1 need not be in the exact order shown and need not be contiguous; that is, other steps can be intermediate. Some steps in FIG. 1 may be omitted according to various types of embodiments or requirements. The method may be briefly summarized as follows:

Step 100: determine whether to control a first device to transmit a specific pulse signal to a second device in a random manner every single time period;

Step 102: determine whether to control the second device to transmit the specific pulse signal to the first device in a random manner every time period;

Step 104: when the first device receives at least one portion of the specific pulse signal earlier than the second device, configure the first device as a master device, and control the master device to stop sending the specific pulse signal and start transmitting a specific sequence; and Step 106: when the second device receives the specific sequence, configure the second device as a slave device.

Figure 2:
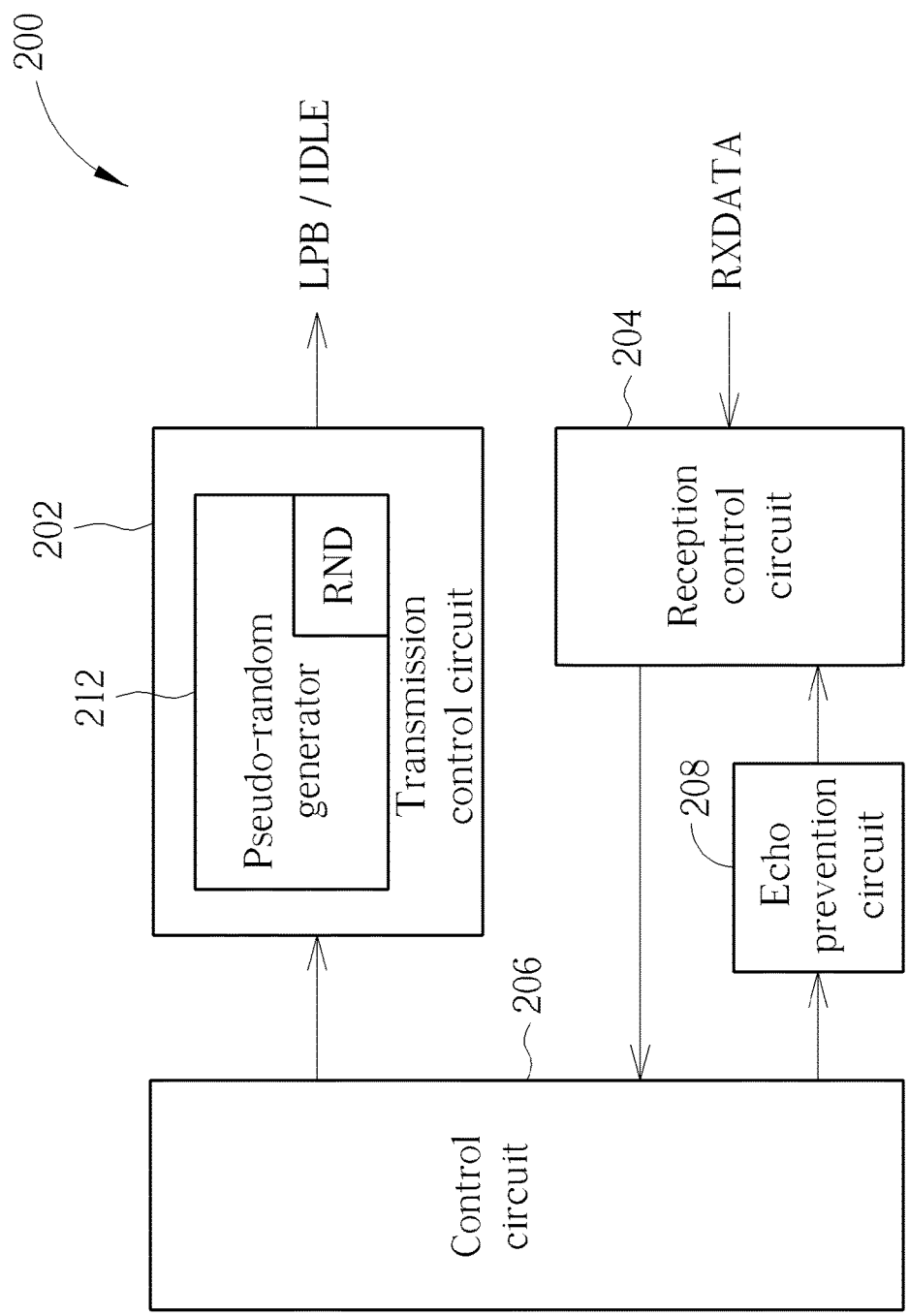
FIG. 2 is a diagram illustrating a master-slave detection circuit according to an exemplary embodiment of the present invention.

Please refer to FIG. 2 in conjunction with FIG. 1. FIG. 2 is a diagram illustrating a master-slave detection circuit according to an exemplary embodiment of the present invention. Each one of a plurality of devices (such as a first device DUT and a second device LP) has a master-slave detection circuit 200 installed thereon. In this embodiment, the master-slave detection circuit 200 includes a transmission control circuit 202, a reception control circuit 204, a control circuit 206, and an echo prevention circuit 208. When the first device DUT has not completed the master-slave detection process with another device, as shown in step 100, the transmission control circuit 202 is utilized to periodically determine whether to control the first device DUT to transmit a specific pulse signal LPB to a second device LP in a random manner, and the transmission control circuit 202 is coupled to the control circuit 206. In this embodiment, the transmission control circuit 202 utilizes a pseudo-random generator 212 to generate a random signal RND every single time period T to determine whether to generate the specific pulse signal LPB. For instance, a pseudo-random sequence polynomial with a specific initial value may be used to generate the random signal RND (e.g. the pseudo-random sequence polynomial may be $X^{10}+X^8+1$) and the initial value of the pseudo-random sequence polynomial may be 00A9H (i.e., 00010101001). In addition, the transmission control circuit 202 will transmit the specific pulse signal LPB only if the random signal RND=1; in other words, the transmission control circuit 202 will not transmit the specific pulse signal LPB when the random signal RND=0. The above embodiments are for illustrative purpose only. The random signal generation mechanism is not limited to the above-mentioned pseudo-random manner; in fact, any other random signal generation mechanism which can achieve the same or similar objective also belongs to the scope of the present invention.

Figure 3:
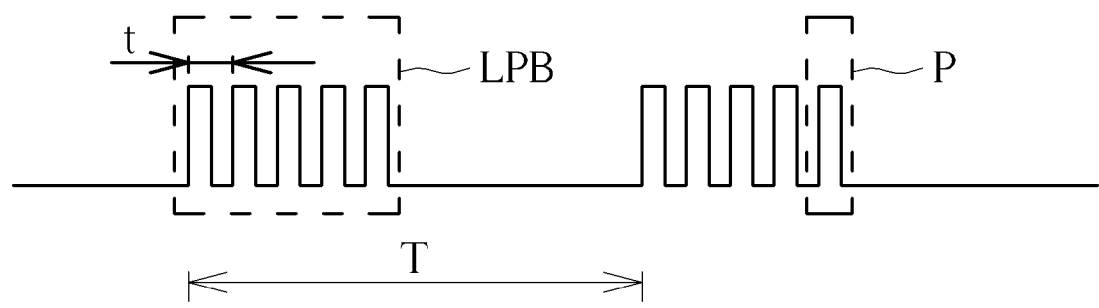
FIG. 3 is a diagram illustrating a specific pulse signal employed in the master-slave detection circuit of the present invention.

Since the second device LP also possesses the master-slave detection circuit 200, the second device LP also determines whether to transmit the specific pulse signal LPB to the first device DUT in a random manner every time period T, i.e., step 102. Please note that in order to distinguish the specific pulse signal LPB from noise on the cable and prevent mistaken identification, the specific pulse signal LPB in the prevent embodiment includes a plurality of single pulses P. FIG. 3 is a diagram illustrating a specific pulse signal employed in the master-slave detection circuit of the present invention, wherein there is a time period t between two consecutive single pulses P, and there is a time period T between two consecutive specific pulse signals LPB. The above embodiments are for illustrative purposes only. The specific pulse signal is not limited to the above-mentioned format; in fact, including any number of single pulses, any other specific pulse signal which can achieve the same or similar objective also belongs to the scope of the present invention.

The reception control circuit 204 built in the first device DUT is utilized to determine whether the first device DUT has received at least a portion of the specific pulse signal LPB transmitted from the second device LP, and the reception control circuit 204 is coupled to the control circuit 206 and the echo prevention circuit 208 respectively. The echo prevention circuit 208 is coupled between the reception control circuit 204 and the control circuit 206, and arranged for controlling the first device DUT to stop receiving signals in a time period $T_{round\_trip\_delay}$ after the first device DUT transmits the specific pulse signal to the second device LP, which prevents the first device DUT from receiving an echo signal introduced by the rebounded transmission signal from itself and mistakenly taking the echo signal as the signals from the second device LP, or even misjudging it as the qualified specific pulse signal LPB. It should be noted that the time period $T_{round\_trip\_delay}$ may be configured based on real situations, such as the length or material of cable. After the first device DUT has transmitted the specific pulse signal LPB to the second device LP and through a time period $T_{round\_trip\_delay}$ if the reception control circuit 204 of the first device DUT determines a received signal RXDATA is received from the second device LP (for instance, three consecutive single pulses P are received), then the reception control circuit 204 will determine that the first device DUT receives the specific pulse signal LPB transmitted from the second device LP. If only two single pulses P are received, then the reception control circuit 204 will not take them as qualified signals, and will not notify the control circuit 206. The control circuit 206 is utilized for configuring the first device DUT as a master device when the reception control circuit 204 indicates the first device DUT has received at least a portion of the specific pulse signal LPB transmitted from the second device LP, and controlling the master device (i.e. the first device DUT) to stop transmitting the specific pulse signal LPB and start transmitting a specific sequence IDLE to the second device LP, i.e. step 104. If, however, the contrary condition happens—that is, the first device DUT receives the specific sequence IDLE—then the control circuit 206 will configure the first device DUT as a slave device, i.e. step 106.

Figure 4:
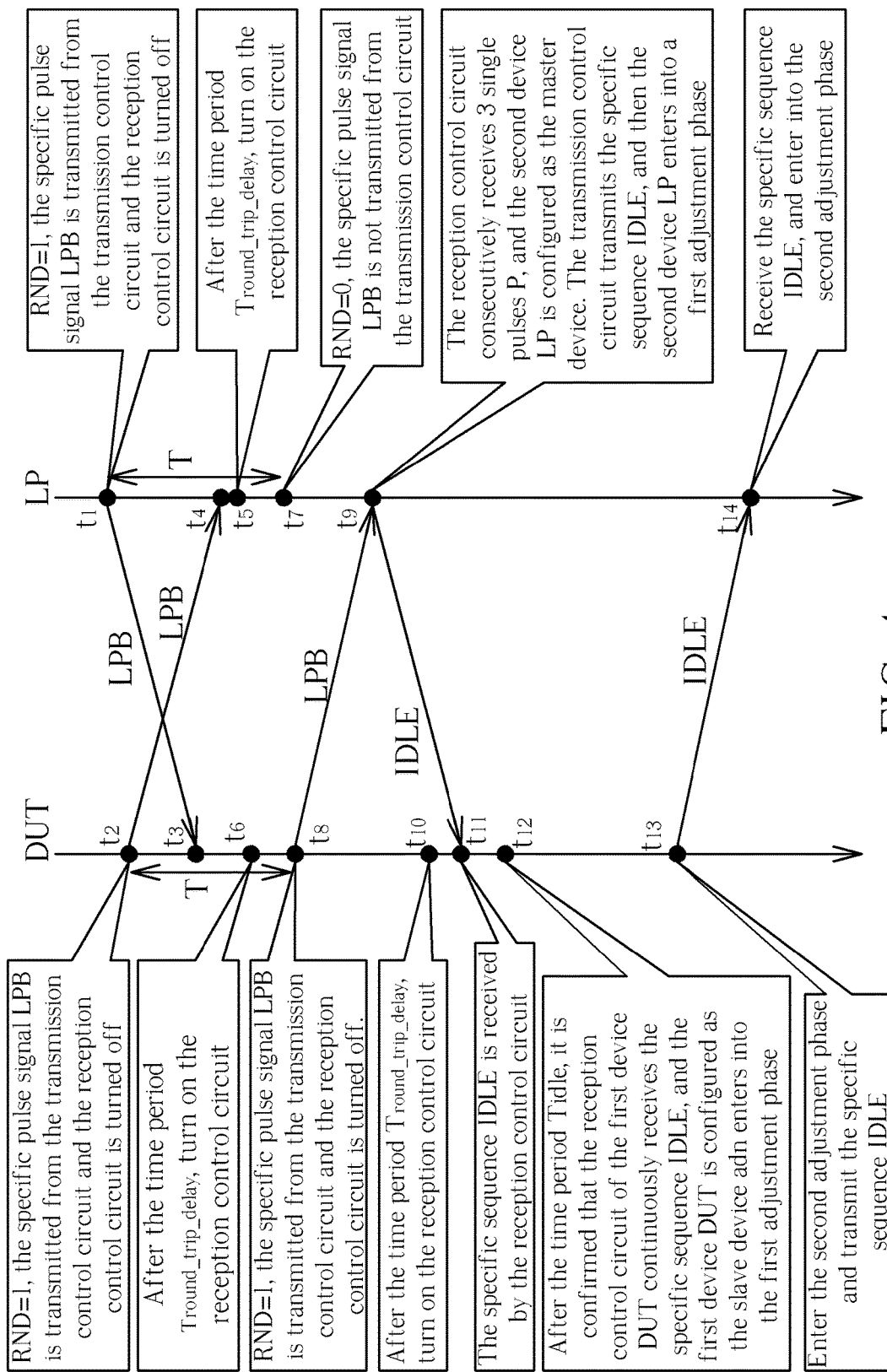
FIG. 4 is an operational timing diagram illustrating the master-slave detection circuit according to an embodiment of the present invention.

For illustrating the operational process of the present invention more comprehensively, a practical case is described in the following. Please refer to FIG. 4, which is an operational timing diagram illustrating the master-slave detection circuit according to an embodiment of the present invention. There are two vertical lines below the text labels DUT and LP, which respectively represent timelines of the first device DUT and the second device LP wherein time is from top to bottom. The black dots on the timelines represent time points when specific events occur. The first device DUT and the second device LP both include the master-slave detection circuit 200 shown in FIG. 2. Initially, the master-slave detection between the first device DUT and the second device LP is not yet completed (e.g. the first device DUT and the second device LP are just connected to each other by a cable, so the allocation of the master and slave devices is not determined), and the transmission control circuit 202 of the second device LP uses the pseudo-random generator 212 to generate the random signal RND=1 at time point $t_1$, which means the second device LP will transmit the specific pulse signal LPB. In order to prevent the reception control circuit 204 of the second device LP from misjudging echo signals as the qualified specific pulse signal LPB, the reception control circuit 204 of the second device LP stops receiving signals (for example, by turning off the reception control circuit 204) until after the time period $T_{round\_trip\_delay}$. The transmission control circuit 202 of the first device DUT also uses the pseudo-random generator 212 to generate the random signal RND=1 at time point $t_2$ slightly later than time point $t_1$, which means the first device DUT will transmit the specific pulse signal LPB. In order to prevent the reception control circuit 204 of the first device DUT from misjudging echo signals as the qualified specific pulse signal LPB, the reception control circuit 204 of the first device DUT stops receiving signals (for example, by turning off the reception control circuit 204) until the time period $T_{round\_trip\_delay}$. At time point $t_3$, the specific pulse signal LPB transmitted by the second device LP arrives at the first device DUT, but the reception control circuit 204 of the first device DUT has not been activated. In other words, the time period from the last time the first device DUT transmitted the specific pulse signal LPB (i.e. time point $t_2$) to time point $t_3$ is not longer than or equal to the time period $T_{round\_trip\_delay}$. Even though the specific pulse signal LPB transmitted by the second device LP arrives at the first device DUT, it will be ignored by the echo prevention circuit 208. Similarly, at time point $t_4$, the specific pulse signal LPB transmitted by the first device DUT arrives at the second device LP, but the reception control circuit 204 of the second device LP has not been activated. In other words, the time period from the last time the second device LP transmitted the specific pulse signal LPB (i.e. time point $t_1$) to time point $t_4$ is not longer than or equal to the time period $T_{round\_trip\_delay}$. Even though the specific pulse signal LPB transmitted by the first device DUT arrives at the second device LP, it will be ignored by the echo prevention circuit 208.

Next, at time point $t_5$, the echo prevention circuit 208 of the second device LP determines that the time period from the last time the second device LP transmitted the specific pulse signal LPB (i.e. time point $t_1$) is longer than or equal to the time period $T_{round\_trip\_delay}$, and it activates the reception control circuit 204 of the second device LP to start analyzing the received signal RXDATA. Similarly, at time point $t_6$, the echo prevention circuit 208 of the first device DUT determines that the time period from the last time the first device DUT transmitted the specific pulse signal LPB (i.e. time point $t_2$) is longer than or equal to the time period $T_{round\_trip\_delay}$ and it activates the reception control circuit 204 of the second device LP to start analyzing the received signal RXDATA. At time point $t_7$, the transmission control circuit 202 of the second device LP determines that the time period from the last time the second device LP transmitted the specific pulse signal LPB (i.e. time point $t_1$) has satisfied the requirement of time period T, and therefore the pseudo-random generator 212 is utilized to generate the random signal RND=0 at time point $t_7$, which indicates not sending the specific pulse signal LPB. Since the second device LP does not transmit the specific pulse signal LPB at this time, the reception control circuit 204 of the second device LP does not need to be suspended for echo prevention; the reception control circuit 204 of the second device LP is still activated and able to provide normal signal reception. Conversely, at time point $t_8$, the transmission control circuit 202 of the first device DUT determines that the time period from the last time the first device DUT transmitted the specific pulse signal LPB (i.e. time point $t_2$) has satisfied the requirement of time period T, and therefore the pseudo-random generator 212 is utilized to generate the random signal RND=1 at time point $t_8$, which indicates sending the specific pulse signal LPB. The reception control circuit 204 of the first device DUT then is suspended for receiving signals until after the time period $T_{round\_trip\_delay}$.

At time point $t_9$, the specific pulse signal LPB transmitted by the first device DUT arrives at the second device LP, and the reception control circuit 204 of the second device LP is activated, and the reception control circuit 204 consecutively receives 3 (or more than 3) single pulses P. Meanwhile the control circuit 206 of the second device LP configures the second device LP as the master device and requests the transmission control circuit 202 transmit the specific sequence IDLE, and then the second device LP enters into a first adjustment phase. The first device DUT receives the specific sequence IDLE at time point $t_{11}$ (at this time the reception control circuit 204 of the first device DUT has been through the time period $T_{round\_trip\_delay}$ and starts normal signal reception), and then it is confirmed that the reception control circuit 204 of the first device DUT continuously receives the specific sequence IDLE for a time period $T_{idle}$ (time point $t_{12}$). Therefore, the control circuit 206 of the first device DUT configures the first device DUT as the slave device, and the first device DUT enters into the first adjustment phase. The first device DUT is capable of performing timing recovery by using the specific sequence IDLE transmitted from the second device LP at the first adjustment phase. At time point $t_{13}$, the first device DUT has completed everything which needs to be done in the first adjustment phase, and then moves on to a second adjustment phase. At the second adjustment phase, the transmission control circuit 202 of the first device DUT transmits the specific sequence IDLE to the second device LP, and the second device LP receives it at time point $t_{13}$, and then moves on to the second adjustment phase.

Figure 5:
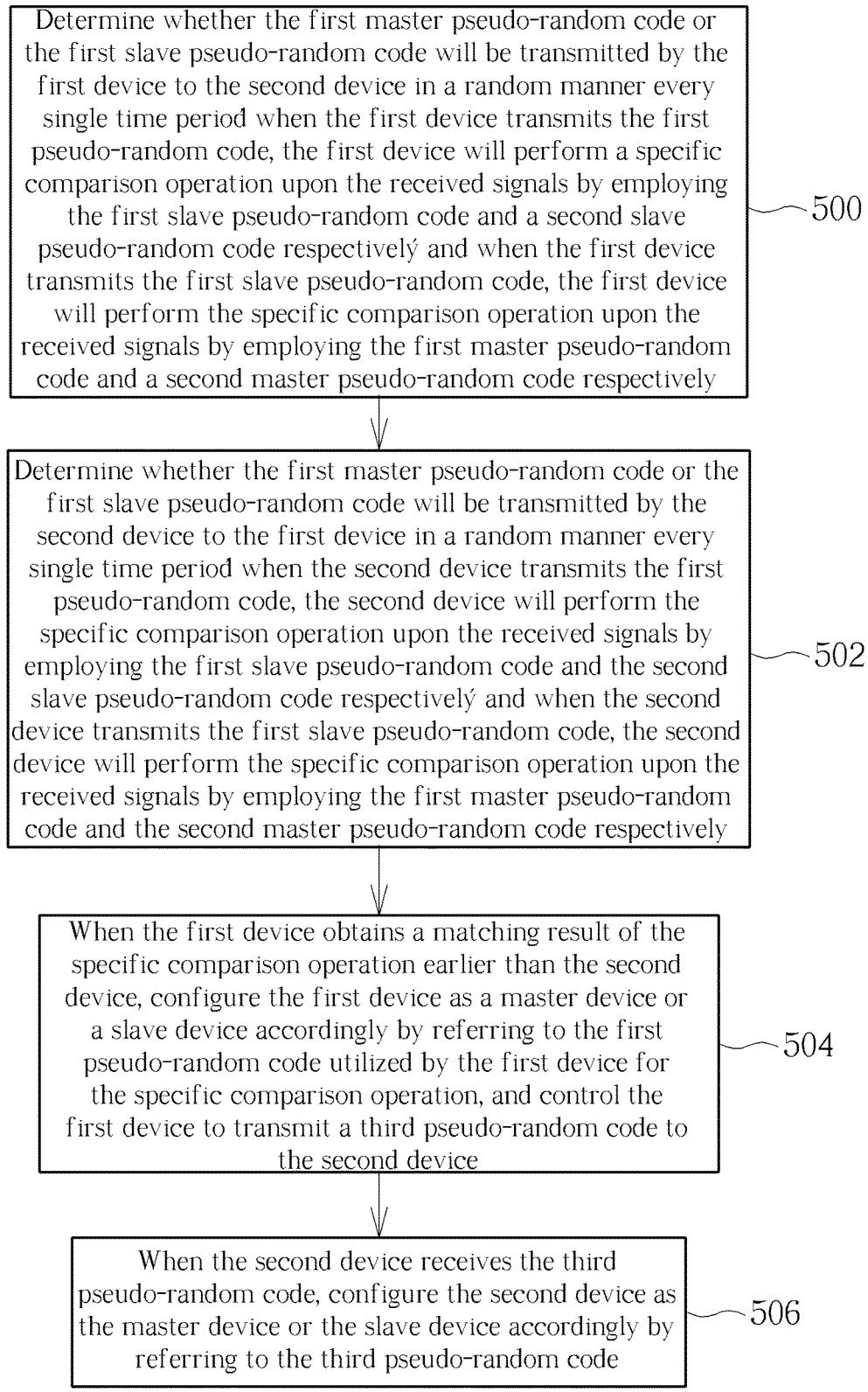
FIG. 5 is a flowchart illustrating a master-slave detection method according to another embodiment of the present invention.

Please refer to FIG. 5, which is a flowchart illustrating a master-slave detection method according to another embodiment of the present invention. Provided that substantially the same result is achieved, the steps of the flowchart shown in FIG. 5 need not be in the exact order shown and need not be contiguous; that is, other steps can be intermediate. Some steps in FIG. 5 may be omitted according to various types of embodiments or requirements. The method may be briefly summarized as follows:

Step 500: determine whether the first master pseudo-random code or the first slave pseudo-random code will be transmitted by the first device to the second device in a random manner every single time period; when the first device transmits the first pseudo-random code, the first device will perform a specific comparison operation upon the received signals by employing the first slave pseudo-random code and a second slave pseudo-random code respectively; and when the first device transmits the first slave pseudo-random code, the first device will perform the specific comparison operation upon the received signals by employing the first master pseudo-random code and a second master pseudo-random code respectively;

Step 502: determine whether the first master pseudo-random code or the first slave pseudo-random code will be transmitted by the second device to the first device in a random manner every single time period; when the second device transmits the first pseudo-random code, the second device will perform the specific comparison operation upon the received signals by employing the first slave pseudo-random code and the second slave pseudo-random code respectively; and when the second device transmits the first slave pseudo-random code, the second device will perform the specific comparison operation upon the received signals by employing the first master pseudo-random code and the second master pseudo-random code respectively;

Step 504: when the first device obtains a matching result of the specific comparison operation earlier than the second device, configure the first device as a master device or a slave device accordingly by referring to the first pseudo-random code utilized by the first device for the specific comparison operation, and control the first device to transmit a third pseudo-random code to the second device; and Step 506: when the second device receives the third pseudo-random code, configure the second device as the master device or the slave device accordingly by referring to the third pseudo-random code.

Figure 6:
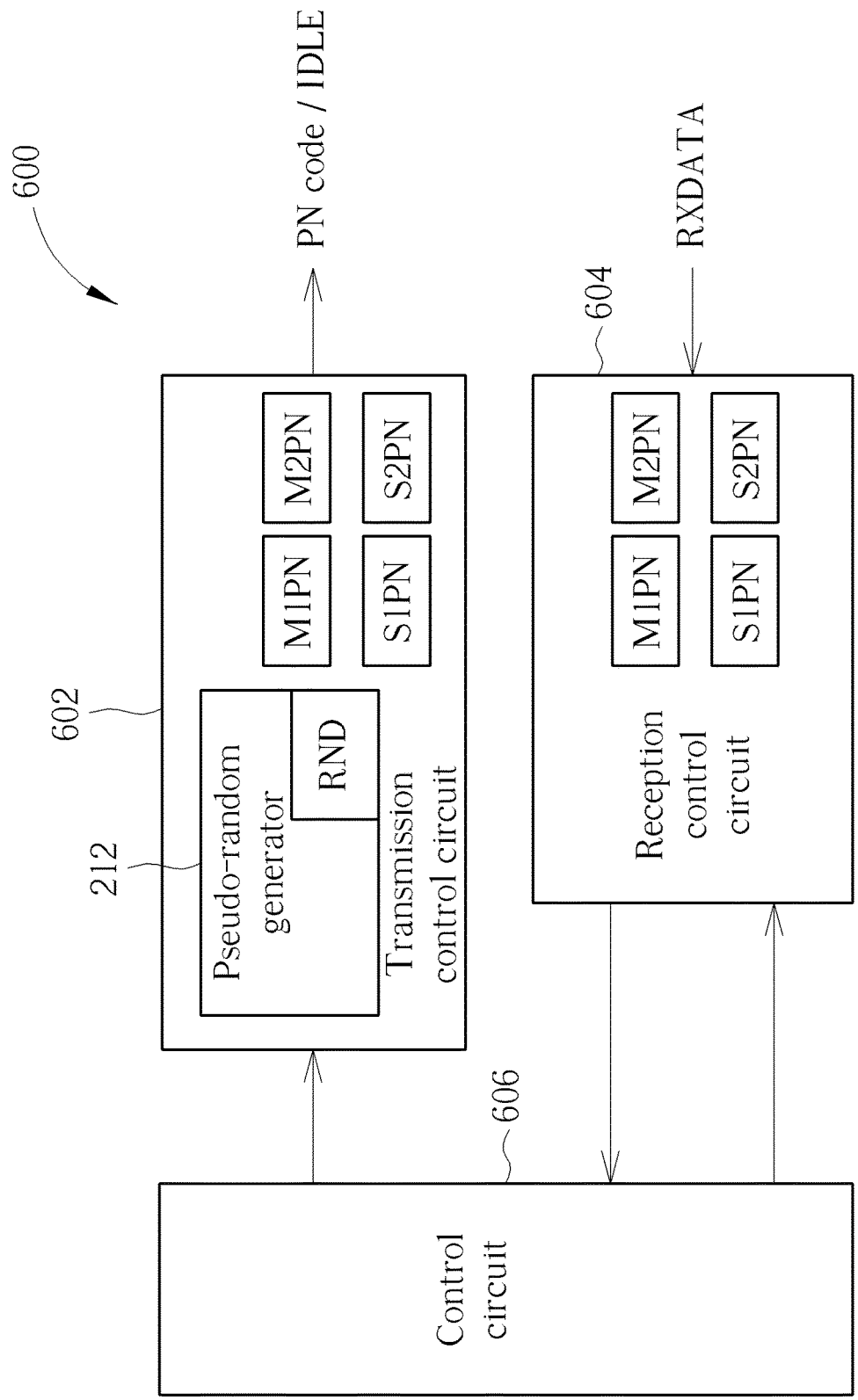
FIG. 6 is a diagram illustrating a master-slave detection circuit according to another exemplary embodiment of the present invention.

Please refer to FIG. 6 in conjunction with FIG. 5. FIG. 6 is a diagram illustrating a master-slave detection circuit according to another exemplary embodiment of the present invention. Each one of a plurality of devices (such as a first device DUT and a second device LP) has a master-slave detection circuit 600 installed thereon. In this embodiment, the master-slave detection circuit 600 includes a transmission control circuit 602, a reception control circuit 604, and a control circuit 606. When the first device DUT has not completed the master-slave detection process with another device, as shown in step 500, the transmission control circuit 602 of the first device DUT generates a first pseudo-random code to the second device LP every single time period T, wherein the first pseudo-random code is a first master pseudo-random code M1PN or a first slave pseudo-random code S1PN. Specifically, the transmission control circuit 602 of the first device DUT utilizes the pseudo-random generator 212 to generate a random signal RND every single time period T, and therefore determines whether a first master pseudo-random code M1PN or the first slave pseudo-random code S1PN will be transmitted from the first device DUT to the second device LP. Please refer to the above descriptions for the operation of the pseudo-random generator 212; details are omitted here for brevity. When the first device DUT transmits the first master pseudo-random code M1PN accordingly by referring to the random signal RND, the reception control circuit 604 of the first device DUT will perform a specific comparison operation upon a received signal RXDATA by using the first slave pseudo-random code S1PN and the second slave pseudo-random code S2PN. When the first device DUT transmits the first slave pseudo-random code S1PN accordingly by referring to the random signal RND, the reception control circuit 604 of the first device DUT will perform the specific comparison operation upon a received signal RXDATA by using the first master pseudo-random code M1PN and the second master pseudo-random code M2PN. For instance, the specific comparison operation may be based on whether a cross correlation result is greater than a threshold, and since the cross correlation value of the first slave pseudo-random code S1PN and the first master pseudo-random code M1PN is quite low, and the cross correlation value of the second slave pseudo-random code S2PN and the first master pseudo-random code M1PN is also quite low (to put it another way, the first pseudo-random code transmitted by the first device DUT has to be different from the pseudo-random code used by the reception control circuit 604 of the first device DUT for the specific comparison operation), the cross correlation of the first pseudo-random code and the pseudo-random code used for performing the specific comparison operation is substantially equal to 0. Even though the echo signal of the first pseudo-random code rebounds at the receiving end, it will not cause an incorrect determination; hence there is no need to control the first device DUT to stop receiving signals in a time period after transmitting signals for preventing the first device DUT from being interfered with by the echo signals.

In short, the first master pseudo-random code M1PN, the second master pseudo-random code M2PN, the first slave pseudo-random code S1PN, and the second slave pseudo-random code S2PN are predetermined pseudo-random codes with appropriate design for ensuring low cross correlation between the first master pseudo-random code M1PN and the first slave pseudo-random code S1PN/the second slave pseudo-random code S2PN, as well as low cross correlation between the first slave pseudo-random code S1PN and the first master pseudo-random code M1PN/the second master pseudo-random code M2PN. The first device DUT selectively transmits the first master pseudo-random code M1PN or the first slave pseudo-random code S1PN as the above-mentioned first pseudo-random code according to the random signal RND generated by its pseudo-random generator 212.

Since the second device LP also has the master-slave detection circuit 600 shown in FIG. 6, the second device LP generates a second pseudo-random code to the first device DUT every single time period T in the same manner, wherein the second pseudo-random code is the first master pseudo-random code M1PN or the first slave pseudo-random code S1PN. Specifically, the transmission control circuit 602 of the second device LP generates the random signal RND every single time period T, and therefore determines whether the first master pseudo-random code M1PN or the first slave pseudo-random code S1PN will be transmitted from the second device LP to the first device DUT. When the second device LP transmits the first master pseudo-random code M1PN accordingly by referring to the random signal RND, the reception control circuit 604 of the second device LP will perform a specific comparison operation upon a received signal RXDATA by using the first slave pseudo-random code S1PN and the second slave pseudo-random code S2PN. However, when the second device LP transmits the first slave pseudo-random code S1PN accordingly by referring to the random signal RND, the reception control circuit 604 of the second device LP will perform the specific comparison operation upon a received signal RXDATA by using the first master pseudo-random code M1PN and the second master pseudo-random code M2PN, i.e. step 502. In short, the cross correlation between the first master pseudo-random code M1PN and the first slave pseudo-random code S1PN/the second slave pseudo-random code S2PN, as well as low cross correlation between the first slave pseudo-random code S1PN and the first master pseudo-random code M1PN/the second master pseudo-random code M2PN are both low through appropriate design. The second device LP selectively transmits the first master pseudo-random code M1PN or the first slave pseudo-random code S1PN as the above-mentioned second pseudo-random code according to the random signal RND generated by its pseudo-random generator 212.

In step 504, when the first device DUT obtains a matching result of the specific comparison operation earlier than the second device LP, the control circuit 606 of the first device DUT will configure the first device DUT as a master device or a slave device accordingly by referring to the first pseudo-random code M1PN or the first slave pseudo-random code S1PN utilized by the first device DUT for the specific comparison operation, and control the first device DUT to transmit a third pseudo-random code to the second device LP, wherein the third pseudo-random code is the second master pseudo-random code M2PN or the second slave pseudo-random code S2PN. For instance, when the reception control circuit 604 calculates the matching results of the specific comparison operation via the first slave pseudo-random code S1PN (the first device DUT transmits the first master pseudo-random code M1PN to the second device LP currently), the control circuit 606 will configure the first device DUT as a master device, and the following third pseudo-random code transmitted by the master device will be the second master pseudo-random code M2PN. However, when the reception control circuit 604 calculates the matching results of the specific comparison operation via the first master pseudo-random code M1PN (the first device DUT transmits the first slave pseudo-random code S1PN to the second device LP currently), the control circuit 606 will configure the first device DUT as a slave device, and the following third pseudo-random code transmitted by the slave device will be the second slave pseudo-random code S2PN.

Lastly, in step 506, when the second device LP receives the third pseudo-random code, it will configure the second device LP as the master device or the slave device accordingly by referring to the third pseudo-random code, wherein if the received third pseudo-random code is the second master pseudo-random code M2PN, then the control circuit 606 of the second device LP will configure the second device LP as the slave device; else if the received third pseudo-random code is the second slave pseudo-random code S2PN, then the control circuit 606 of the second device LP will configure the second device LP as the master device.

Figure 7:
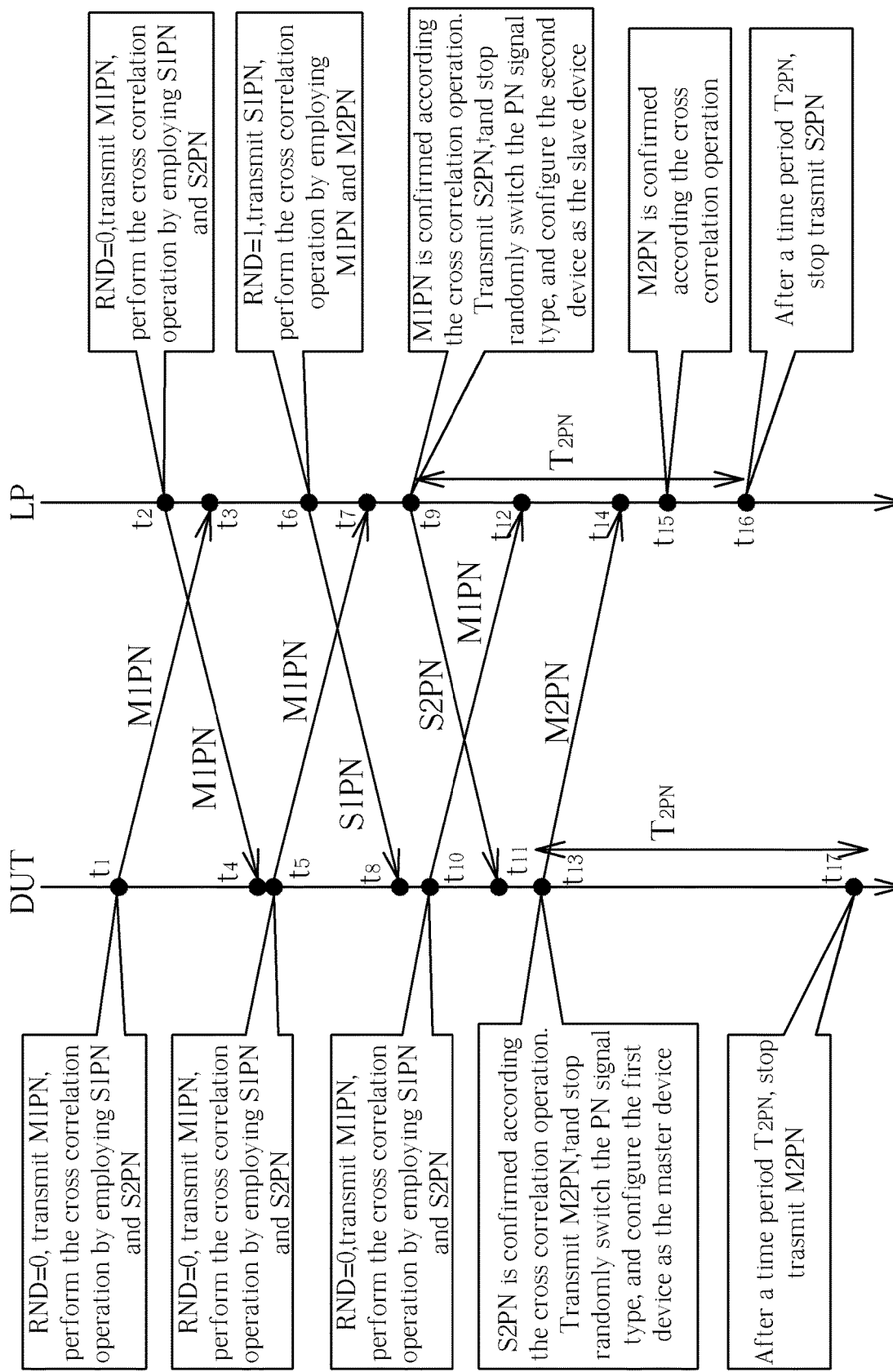
FIG. 7 is an operational timing diagram illustrating the master-slave detection circuit according to another embodiment of the present invention.

For illustrating the operational process of the present invention more comprehensively, a practical case is described in the following. Please refer to FIG. 7, which is an operational timing diagram illustrating the master-slave detection circuit according to another embodiment of the present invention. There are two vertical lines below the text labels DUT and LP respectively, which represent timelines of the first device DUT and the second device LP, wherein time is from top to bottom. The black dots on the timelines represent time points when specific events occur. Initially, the master-slave detection between the first device DUT and the second device LP is not yet completed (e.g. the first device DUT and the second device LP are merely connected to each other by a cable, meaning the allocation of the master and slave devices is not determined). The transmission control circuit 602 of the first device DUT uses the pseudo-random generator 212 to generate the random signal RND=0 at time point $t_1$, which means the first device DUT will transmit the first master pseudo-random code M1PN, and the reception control circuit 604 will perform a cross correlation operation upon the received signal RXDATA by employing the first slave pseudo-random code S1PN and the second slave pseudo-random code S2PN. The transmission control circuit 602 of the second device LP also uses the pseudo-random generator 212 to generate the random signal RND=0 at time point $t_2$ which is slightly later than time point $t_1$. This means the second device LP will transmit the first master pseudo-random code M1PN, and the reception control circuit 604 of the second device LP will perform a cross correlation operation upon the received signal RXDATA by employing the first slave pseudo-random code S1PN and the second slave pseudo-random code S2PN. At time point $T_3$, the first master pseudo-random code M1PN transmitted from the first device DUT arrives at the second device LP, but the reception control circuit 604 of the second device LP performs the cross correlation operation upon the received first master pseudo-random code M1PN by employing the first slave pseudo-random code S1PN and the second slave pseudo-random code S2PN at this time point; therefore, the result of the cross correlation operation does not exceed the threshold. The received first master pseudo-random code M1PN is therefore ignored by the second device LP. Similarly, at time point $T_4$, the first master pseudo-random code M1PN transmitted from the second device LP arrives at the first device DUT, but the reception control circuit 604 of the first device DUT performs the cross correlation operation upon the received first master pseudo-random code M1PN by employing the first slave pseudo-random code S1PN and the second slave pseudo-random code S2PN at this time point. Therefore the result of the cross correlation operation does not exceed the threshold. The received first master pseudo-random code M1PN is then ignored by the first device DUT.

Next, at time point $t_5$, the transmission control circuit 602 of the first device DUT determines that the time period from the last time the first device DUT transmitted the first master pseudo-random code M1PN (i.e. time point $t_1$) is longer than or equal to the time period T; hence, at this time point the pseudo-random generator 212 is used to generate the random signal RND=0, which means the first device DUT will transmit the first master pseudo-random code M1PN, and the reception control circuit 604 of the first device DUT will perform a cross correlation operation upon the received signal RXDATA by employing the first slave pseudo-random code S1PN and the second slave pseudo-random code S2PN. Conversely, at time point $t_6$, the transmission control circuit 602 of the second device LP determines that the time period from the last time the second device LP transmitted the first master pseudo-random code M1PN (i.e. time point $t_2$) is longer than or equal to the time period T; hence, at this time point the pseudo-random generator 212 is used to generate the random signal RND=1, which means the second device LP will transmit the first slave pseudo-random code S1PN, and the reception control circuit 604 of the second device LP will perform a cross correlation operation upon the received signal RXDATA by employing the first master pseudo-random code M1PN and the second master pseudo-random code M2PN.

At time point $t_7$, the first master pseudo-random code M1PN transmitted by the first device DUT arrives at the second device LP, and the reception control circuit 604 of the second device LP obtains the cross correlation result higher than the threshold, in other words, the first master pseudo-random code M1PN is successfully identified by the reception control circuit 604 of the second device LP. The control circuit 606 of the second device LP will then configure the second device LP as the slave device (according to the first slave pseudo-random code S1PN transmitted by the second device LP) and request the transmission control circuit 602 to change for transmitting the second slave pseudo-random code S2PN, and further stop using the pseudo-random generator 212 to generate the random signal RND for randomly switching the signal type every time period T. The first device DUT receives the second slave pseudo-random code S2PN at time point $t_{11}$, and the reception control circuit 604 of the first device DUT obtains the cross correlation result higher than the threshold. In other words, the second slave pseudo-random code S2PN is successfully identified by the reception control circuit 604 of the first device DUT. The control circuit 606 of the first device DUT will then configure the first device DUT as the master device (according to the first master pseudo-random code M1PN transmitted by the first device DUT) and request the transmission control circuit 602 to change for transmitting the second master pseudo-random code M2PN, and further stop using the pseudo-random generator 212 to generate the random signal RND for randomly switching the signal type every time period T. Lastly, once the master/slave configurations of the first device DUT and the second device LP are both determined, the link will be confirmed and regarded as stable after a time period $T_2PN$. Thereby the specific sequence IDLE will be transmitted, wherein details are similar to the descriptions in the previous paragraphs and therefore omitted here for brevity.

The automatic master-slave detection mechanism of the present invention can also be easily changed to a manual designation mechanism. The transmission control circuit of the first device DUT can be enforced to hold the transmission of the specific pulse LPB, so that the second device LP does not have to receive a specific pulse LPB. In this case, if the second device LP has a normal master-slave detection function, the first device DUT will receive three consecutive qualified specific pulses LPB sooner or later, and the first device DUT will be determined to be the master device. To enforce the transmission control circuit of the first device DUT to hold the transmission of the specific pulse LPB means enforcing the first device DUT to be the master device. Alternatively, the reception control circuit of the first device DUT can be enforced to not check the specific pulse LPB, therefore the first device DUT does not have to receive a specific pulse LPB. In this case, if the second device LP has a normal master-slave detection function, the first device DUT will receive three consecutive qualified specific pulses LPB sooner or later, and the first device DUT will be determined to be the master device. To enforce the reception control circuit of the first device DUT to not check the specific pulse LPB is to enforce the first device DUT to be the master device. In another example, if both transmission control circuits (the first device DUT and the second device LP) to not transmit the specific pulse LPB (enforce both the first device DUT and the second device LP to be the master device), the link will fail, since the two sides are both enforced to be master devices.

The present invention overcomes the collision problem of the two devices in a fast Ethernet single-pair UTP system and achieves the purpose of automatic master-slave detection. An automatic master-slave detection mechanism is proposed in the present invention, which can allocate two devices in a single-pair UTP system as a master device and a slave device; therefore, the usability of the single-pair UTP system will be significantly increased and the cost and weight of cable in the system will be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A master-slave detection method, comprising:
   determining whether to control a first device to transmit a first specific pulse signal to a second device;
   determining whether to control the second device to transmit a second specific pulse signal to the first device;
   when the first device receives at least one portion of the second specific pulse signal earlier than when the second device receives the at least one portion of the first specific pulse signal, configuring the first device as a master device, and controlling the master device to stop sending the first specific pulse signal and to start transmitting a specific sequence; and
   when the second device receives the specific sequence, configuring the second device as a slave device;
   wherein the first specific pulse signal and the second specific pulse signal have the same signal pattern.

2. The master-slave detection method of claim 1, wherein the step of determining whether to control the first device to transmit the first specific pulse signal comprises:
   determining whether to control the first device to transmit the first specific pulse signal to the second device in a random manner every single time period; and
   the step of determining whether to control the second device to transmit the specific pulse signal to the first device comprises:
   determining whether to control the second device to transmit the second specific pulse signal to the first device in a random manner every single time period.

3. The master-slave detection method of claim 2, further comprising:
   after the first device transmits the first specific pulse signal to the second device, controlling the first device to stop receiving the second specific pulse signal in a time period; and
   after the second device transmits the second specific pulse signal to the first device, controlling the second device to stop receiving the first specific pulse signal in a time period.

4. The master-slave detection method of claim 1, wherein the first device and the second device are set in a wired transmission system, and the wired transmission system is a single-pair Ethernet system.

5. The master-slave detection method of claim 1, wherein each of the first specific pulse signal and the second specific pulse signal comprises a plurality of single pluses, and the at least one portion of the specific pulse signal comprises continuous single pulses.

6. A master-slave detection method, comprising:
utilizing a first device to periodically transmit a first pseudo-random code to a second device, wherein the first pseudo-random code is a first master pseudo-random code or a first slave pseudo-random code; when the first device transmits the first pseudo-random code, the first device will perform a specific comparison operation upon the received signals by employing the first slave pseudo-random code and a second slave pseudo-random code respectively; and when the first device transmits the first slave pseudo-random code, the first device will perform the specific comparison operation upon the received signals by employing the first master pseudo-random code and a second master pseudo-random code respectively;
utilizing the second device to periodically transmit a second pseudo-random code to the first device, wherein the second pseudo-random code is the first master pseudo-random code or the first slave pseudo-random code; when the second device transmits the first pseudo-random code, the second device will perform the specific comparison operation upon the received signals by employing the first slave pseudo-random code and the second slave pseudo-random code respectively; and when the second device transmits the first slave pseudo-random code, the second device will perform the specific comparison operation upon the received signals by employing the first master pseudo-random code and the second master pseudo-random code respectively;
when the first device obtains a matching result of the specific comparison operation earlier than the second device, configuring the first device as a master device or a slave device accordingly by referring to the first pseudo-random code utilized by the first device for the specific comparison operation, and controlling the first device to transmit a third pseudo-random code to the second device; and
when the second device receives the third pseudo-random code, configuring the second device as the master device or the slave device accordingly by referring to the third pseudo-random code.

7. The master-slave detection method of claim 6, wherein the step of utilizing the first device to periodically transmit the first pseudo-random code comprises
determining whether the first master pseudo-random code or the first slave pseudo-random code will be transmitted by the first device to the second device in a random manner every single time period; and
the step of utilizing the second device to periodically transmit the second pseudo-random code comprises
determining whether the first master pseudo-random code or the first slave pseudo-random code will be transmitted by the second device to the first device in a random manner every single time period.

8. The master-slave detection method of claim 6, wherein the first device and the second device are set in a wired transmission system, and the wired transmission system is a single-pair Ethernet system.

9. The master-slave detection method of claim 6, wherein the specific comparison operation is a cross-correlation operation.

10. The master-slave detection method of claim 6, wherein the third pseudo-random code is the second master pseudo-random code or the second slave pseudo-random code; when the first device is configured as the master device, the third pseudo-random code transmitted by the master device is the second master pseudo-random code; and when the first device is configured as the slave device, the third pseudo-random code transmitted by the slave device is the second slave pseudo-random code.

11. The master-slave detection method of claim 10, wherein when the third pseudo-random code received by the second device is the second master pseudo-random code, the second device will be configured as the slave device; and when the third pseudo-random code received by the second device is the second slave pseudo-random code, the second device will be configured as the master device.

12. A master-slave detection circuit, comprising:
a transmission control circuit, arranged for periodically determining whether a device transmits a specific pulse signal to another device;
a reception control circuit, arranged for determining whether the device receives at least one portion of the specific pulse signal; and
a control circuit, arranged for configuring the device as a master device when the device receives at least one portion of the specific pulse signal, and controlling the master device to stop transmitting the specific pulse signal and start transmitting a specific sequence; or configuring the device as a slave device when the device receives the specific sequence;
wherein the transmission control circuit comprises:
a pseudo-random generator, arranged for determining whether the device transmits the specific pulse signal to another device in a random manner every single time period.

13. The master-slave detection circuit of claim 12, further comprising:
an echo prevention circuit, arranged for controlling the device to stop receiving signals in a time period after the device transmits the specific pulse signal to another device.

14. The master-slave detection circuit of claim 12, wherein the device is set in a wired transmission system, and the wired transmission system is a single-pair Ethernet system.

* * * * *